United States Patent
Barclay et al.

(10) Patent No.: US 7,251,809 B2
(45) Date of Patent: Jul. 31, 2007

(54) DYNAMIC GENERATION OF PROGRAM EXECUTION TRACE FILES IN A STANDARD MARKUP LANGUAGE

(75) Inventors: Brad J. Barclay, Toronto (CA); Emad Boctor, Toronto (CA); Andrew W. Hilden, Aurora (CA); Darin C. McBride, Sherwood Park (CA)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/411,467

(22) Filed: Apr. 10, 2003

(65) Prior Publication Data

US 2003/0196192 A1    Oct. 16, 2003

(30) Foreign Application Priority Data

Apr. 12, 2002  (CA) .................................. 2381605

(51) Int. Cl.
*G06F 9/44* (2006.01)
(52) U.S. Cl. ..................... 717/128; 717/124; 717/131
(58) Field of Classification Search ............... 717/124, 717/125, 126, 127, 128, 130, 131; 715/713
See application file for complete search history.

(56) References Cited

U.S. PATENT DOCUMENTS

| | | | | |
|---|---|---|---|---|
| 6,119,247 | A * | 9/2000 | House et al. ................. | 714/38 |
| 6,189,141 | B1 * | 2/2001 | Benitez et al. .............. | 717/153 |
| 6,269,447 | B1 * | 7/2001 | Maloney et al. ............. | 726/25 |
| 6,351,845 | B1 * | 2/2002 | Hinker et al. ............... | 717/128 |
| 6,654,949 | B1 * | 11/2003 | Fraenkel et al. ............ | 717/130 |
| 6,792,460 | B2 * | 9/2004 | Oulu et al. .................. | 709/224 |
| 6,889,158 | B2 * | 5/2005 | Penov et al. ................ | 702/119 |
| 6,907,546 | B1 * | 6/2005 | Haswell et al. .............. | 714/38 |
| 6,944,848 | B2 * | 9/2005 | Hartman et al. ............ | 717/124 |
| 6,993,748 | B2 * | 1/2006 | Schaefer ..................... | 717/124 |
| 7,007,269 | B2 * | 2/2006 | Sluiman et al. ............. | 717/130 |
| 7,100,152 | B1 * | 8/2006 | Birum et al. ................ | 717/131 |

OTHER PUBLICATIONS

"Graphical Animation of Behavior Models", Jeff Magee et al, ACM, 2000, pp. 499-508.*
"Meta-Models are Models Too", Hans Vangheluwe et al, 2002 Winter Simulation Conference, pp. 597-605.*
"Managing Event Traces a Web Front-End to Parallel Simulation", Boon Ping Gan et al, Winter Simulation Conference, pp. 637-644.*
"Building Quality into Digital Library" Hussein Sulman et al, ACM, 2000, pp. 228-229.*

* cited by examiner

*Primary Examiner*—Todd Ingberg
(74) *Attorney, Agent, or Firm*—Duke W. Yee; Jeffrey S. LaBaw; James O. Skarsten

(57) ABSTRACT

The placement of trace points in software code being developed in a software development tool leads to the generation of trace point messages when the code is executed. These trace point messages are listened for by aspects of the software development tool. Responsive to receiving one of the trace point messages, the software development tool may write information to a trace file. Advantageously, the trace file is formatted using a standard markup language format, such as HTML. Consequently, the trace file is readily readable (including information-conveying formatting) by a standard, freely available web browser, rather than a proprietary tool.

7 Claims, 5 Drawing Sheets

DYNAMIC GENERATION OF PROGRAM EXECUTION TRACE FILES IN A STANDARD MARKUP LANGUAGE

FIELD OF THE INVENTION

The present invention relates to the generation of program execution trace files and, more particularly, the dynamic generation of program execution trace files in a standard markup language.

BACKGROUND

Developing software can be a complex task. As such, many tools have been developed to assist in reducing the complexity of this task. Software code may be composed, edited and executed within such a tool so that the tool may monitor the execution of the code and trace the flow of the execution.

Tracing is fairly common in software development. However, typically, software development tools produce program execution trace files in one of two formats. The first of these formats is plain text, which is suitable for viewing with text editors that are plentiful and freely available. The second of these formats is a binary format, which is only suitable for viewing with specialized tools, for instance, the tool that created the program execution trace file.

The first format is problematic in that the type of visual information that may be displayed is limited to plain text, that is, text without special attributes (e.g., colors, indentation) which are often helpful in understanding the structure of the program execution trace file at a glance. If the developer wishes to format the plain text trace file, say to identify key features of the trace file, it is up to the developer to devise formatting routines. Such a formatting routine would be run with a plain text trace file as input and produce a formatted trace file as output. The second format is problematic in that the binary format is typically proprietary and custom tools are required to parse and display the program execution trace file. The developer may not be able to share the program execution trace file with a colleague that does not have access to the tool that produced the trace file.

Accordingly, a solution that addresses, at least in part, this and other shortcomings is desirable.

SUMMARY

Program execution trace files, useful when debugging software, are dynamically generated using a standard markup language, such as the Hyper-Text Markup Language (HTML), for formatting. The resulting markup-language-coded version of the program execution trace file is dynamically generated during program execution and may contain information on entry and exit points, internal errors and internal data points.

Advantageously, an HTML trace file is readable using standard tools (a web browser). Furthermore, visual and color cues may be added to the trace file to make viewing the trace file more intuitively obvious and easier to follow.

In accordance with an aspect of the present invention there is provided a method of manipulating a program execution trace file, the method performed by a data processing unit executing predetermined computer programmed instructions. The method includes receiving a trace point message, reading trace point data from the trace point message and writing the trace point data to the program execution trace file, where the trace point data is formatted using a standard markup language. In other aspects of the present invention, a software development tool is provided that is operable to perform this method along with a system for software development for performing this method. Additionally, a computer readable medium is provided to allow a general purpose computer to perform this method.

In accordance with another aspect of the present invention there is provided an object for implementation by a computer in an object-oriented framework. The object includes a data observer, adapted to receive a trace point message and read trace point data from the trace point message and a standard markup language formatter, adapted to receive the trace point data from the data observer and write the trace point data to a program execution trace file, where the trace point data is formatted using a standard markup language.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

In overview, a method is provided herein for dynamically generating HTML formatted program execution trace files. Appropriately coded classes post messages when trace points occur during execution of source code. Trace points may be placed in the source code by a software developer in order to occur when a function is entered, when a function is exited, when an error occurs or when other useful data exists. The posted messages are received and used to dynamically generate an HTML formatted program trace file.

In practice, a set of C++ classes has been developed for implementing the dynamic generation of HTML formatted program trace files. One class provides a mechanism for other classes to post messages whenever trace points occur. Another class acts as a listener for the posted messages and dynamically generates an HTML formatted program trace file based on the messages. Notably, the "listener" class is not state-dependent, that is, the "listener" class does not need to keep track of previous messages or invocations, yet the "listener" class generates perfectly valid HTML.

Figure 1:
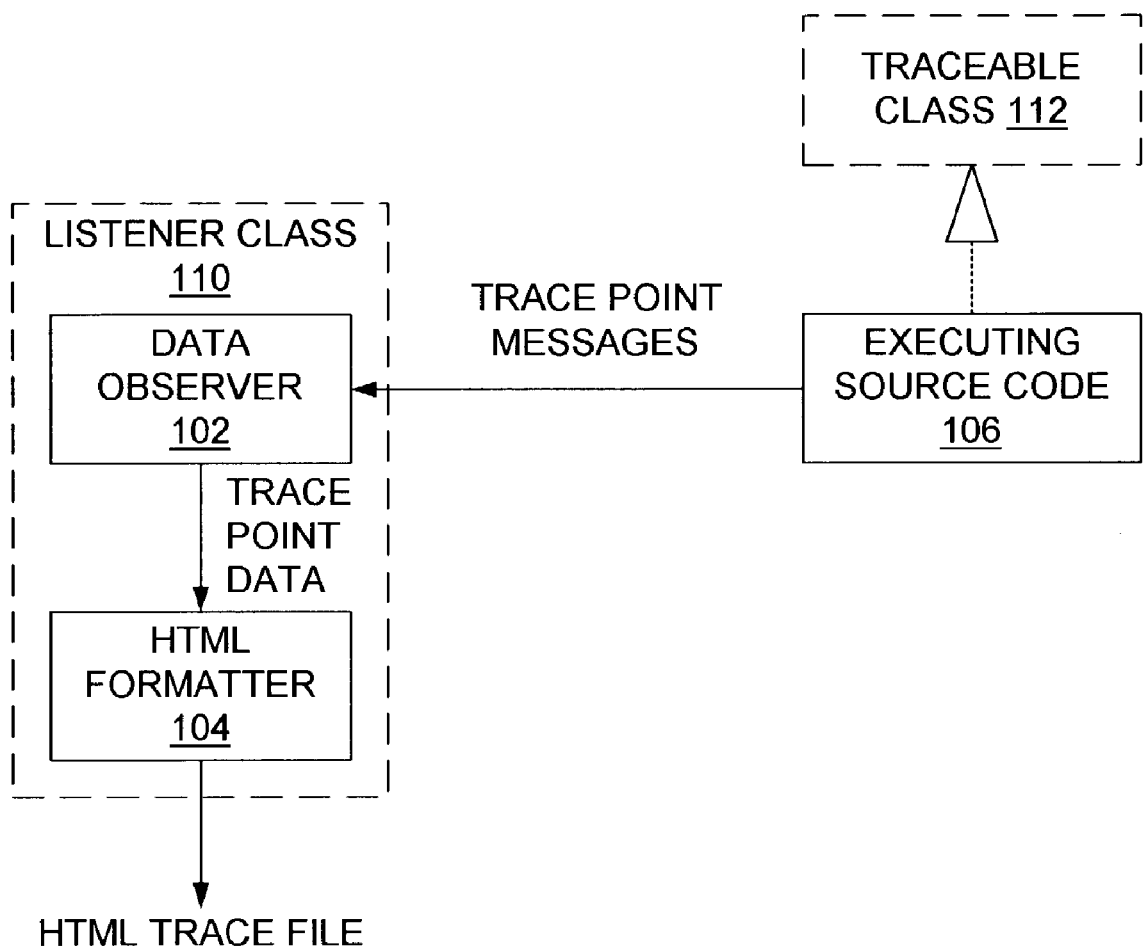
FIG. 1 illustrates a logical view of the operation of aspects of a software development tool.

A logical view of the operation of aspects of the invention is illustrated in FIG. 1. A listener class 110 includes a data observer 102 and an HTML formatter 104. An executing source code 106 references an abstract traceable class 112 to gain an ability to post messages whenever trace points occur. The data observer 102 receives trace point messages generated by the executing source code 106. Trace point data is extracted from these received trace point messages and output to the HTML formatter 104. The output of the HTML formatter 104 is an HTML trace file with appropriate formatting.

The source code 106 contains trace points along with the logic necessary for program execution. Preferably, each function present in the source code 106 has a trace point at the beginning and trace point at the end. Throughout the middle of a given function there may also be trace points for tracing data that may be helpful in understanding the operation of the given function.

Exemplary trace points discussed herein may be categorized into four main categories: Entry Point; Exit Point; Data Point; and Error Point. A trace point in the Entry Point category triggers the generation of a message when a function has been entered. A trace point in the Exit Point category triggers the generation of a message when a function has been exited and, if there is a return value, then the return value is included in the generated message. A trace point in the Data Point category triggers the generation of a message to show information. A trace point in the Error Point category triggers the generation of a message to show information, like a trace point in the Data Point category, however a trace point in the Error Point category is placed to trigger the generation of a message only in the occurrence of an error. Messages for Error Points may be generated when something happens during the execution of the source code 106 that is not generally expected in the context of the source code 106 being executed. Like messages generated responsive to Data Point category trace points, Error Point category trace points may record (log) data to help determine what has happened.

Types may also be included in messages generated in response to trace points. Knowledge of the type of trace point data that is passed in a message may aid in formatting the trace point data by the HTML formatter 104. Additionally, an object may be passed in a message generated in response to a trace point. The object may have an object-specific formatting implementation. For example, where a user has many properties, such as a username, a home directory and group identifier, a user object that includes these properties, along with formatting details, may be derived from an abstract class of traceable objects. The abstract class of traceable objects may, for instance, be called "Traceable" and implement a "formatForTrace" method. Upon receiving a traceable object in a message, the data observer 102 may call the "formatForTrace" method so that the HTML formatter 104 may insert the properties, formatted according to the formatting details, into the HTML trace file being generated.

The data observer 102 listens for messages, or "events", generated by the executing source code 106. Once a message is received, the data observer 102 may determine the contents of the message. If a given message was generated in response to a trace point, then the message and contents may be communicated to the HTML formatter 104 as trace point data. The data observer 102 may also serve to serialize the trace point data before communication to the HTML formatter 104. Serialization may be performed so that attributes (e.g., indentation, color) of the trace point information in the HTML-formatted trace file output remain consistent. As will be apparent to a person skilled in the art, serialization may well be performed at the HTML formatter 104.

The HTML formatter 104 receives trace point data and uses the trace point data to produce an HTML-formatted trace file. The logic necessary to generate the HTML trace file may be stored at the HTML formatter 104. Formatting the received trace point data may involve indenting and color coordinating the trace point identity according to the function in which the original trace point was placed. The HTML formatter 104 may also format the data in the trace points appropriately within the HTML. That is, the data is formatted to be viewed in a standard HTML viewer (such as a web browser, e.g., Internet Explorer by Microsoft® of Redmond Wash.) such that the data is conveyed in a simple and easy to use manner. Such data may presented as a string, a hex dump, a digit or any other format that improves the readability of the data.

Counters may be used to manage the indentation and colors of the trace point data as presented in HTML. A number of different, contrasting colors may be used to highlight a context. The color coordination serves to group trace point data by function, as is typical in traditional trace files. The more colors that are used, the less frequently the colors are repeated in the trace file. However, if too many colors are used, the context-dependence on the colors may be lost when two or more colors are difficult to distinguish. It has been found that seven colors provides an appropriate amount of distinction and an appropriate number of levels of indentation before a color is used again. With this number of colors in mind, the color counter may be preset to cycle from zero to a maximum value of six, whereat an increment will cause the color counter to return to zero (i.e., the color counter is a modulo-7 counter).

Figure 2:
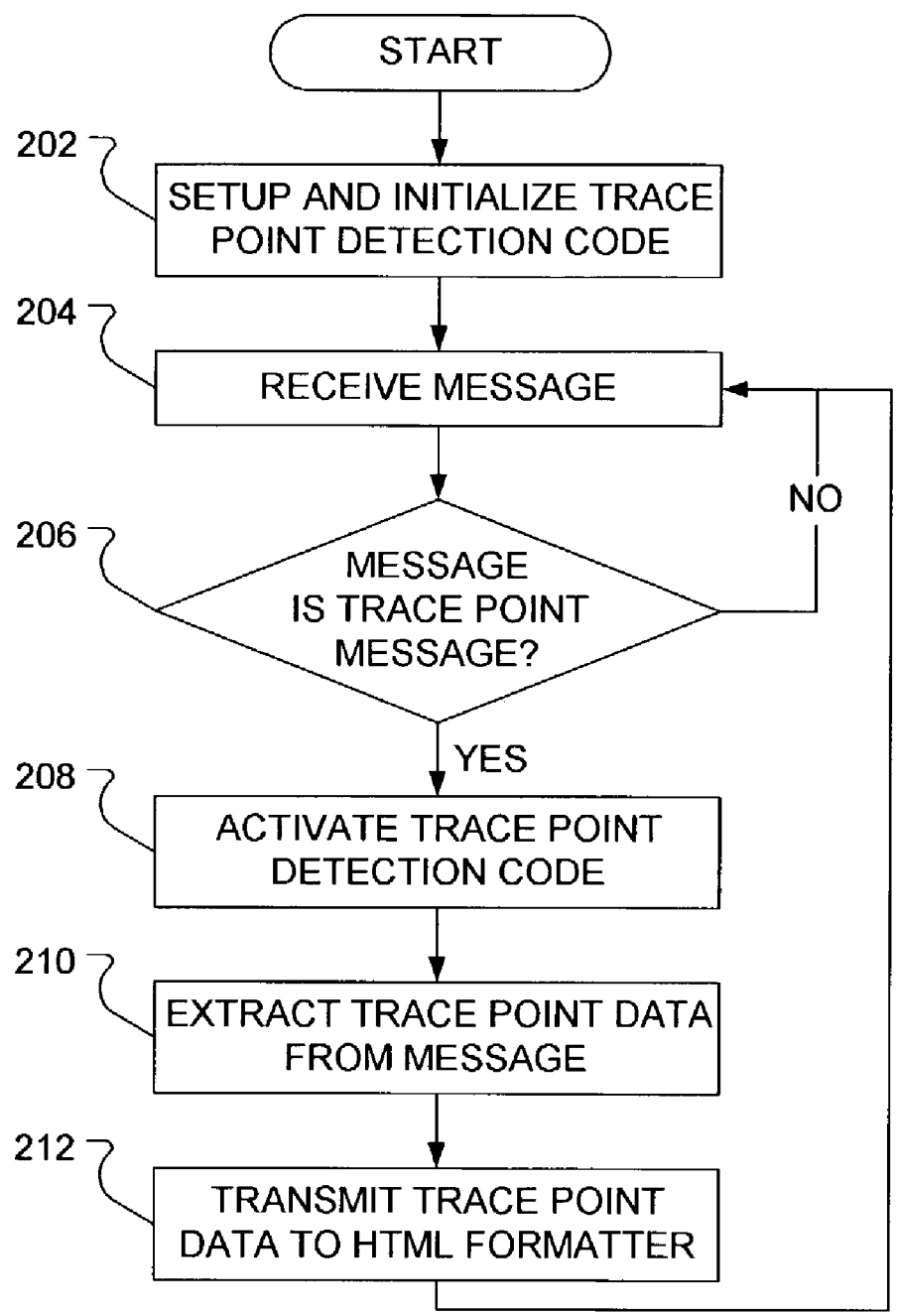
FIG. 2 illustrates a process flow diagram for a message processing method.

The operation of the data observer 102 is illustrated in a flow diagram in FIG. 2. At the outset, the trace point detection code is setup an initialized (step 202). The executing source code 106 is likely to generate multiple messages, only some of which are trace point messages. Consequently, each time a message is received by the data observer 102 (step 204), a determination is made as to whether the message is a trace point message (step 206). If the message is other than a trace point message the data observer 102 waits to receive a subsequent message (step 204). However, if the message is a trace point message, trace point detection code is activated (step 208). The task of the trace point detection code is to extract trace point data from the trace point message (step 210) and transmit the extracted data to the HTML formatter 104 (step 212).

Figure 3:
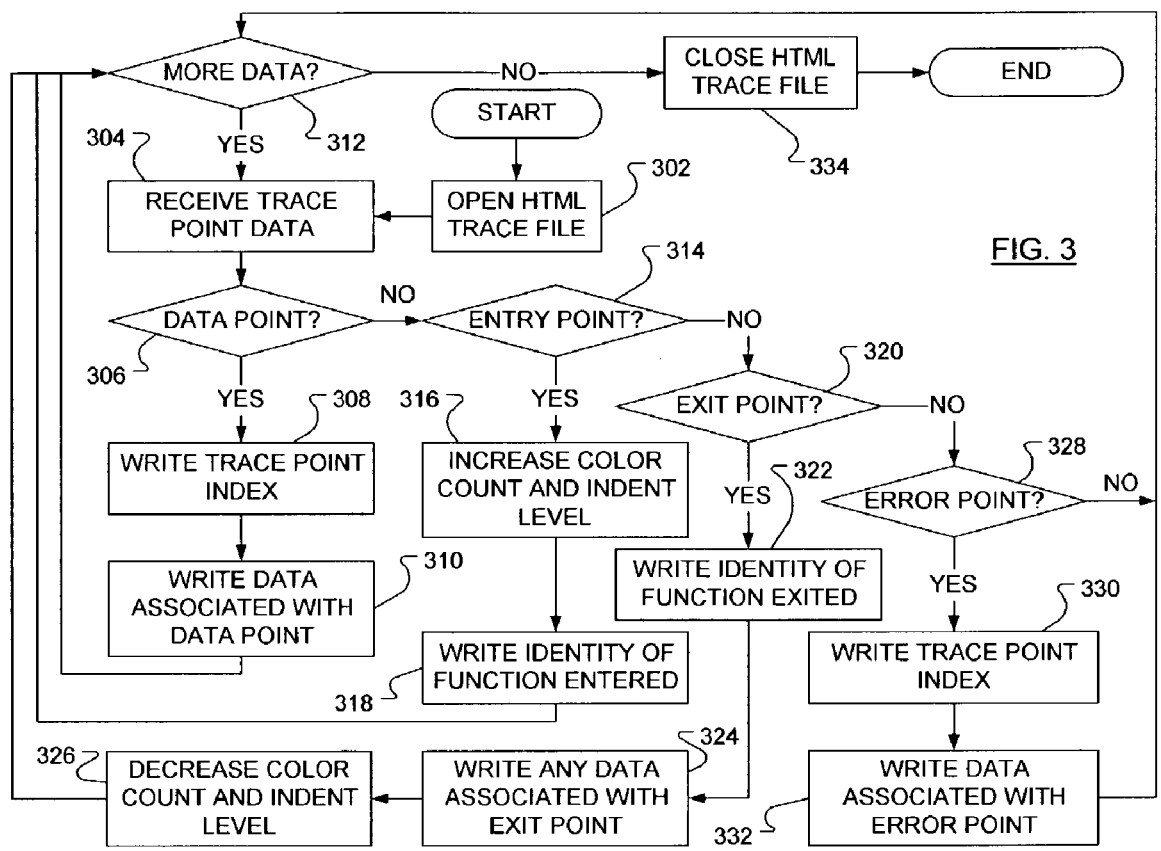
FIG. 3 illustrates a process flow diagram for a trace file formatting method.

The operation of the HTML formatter 104 is illustrated in a flow diagram in FIG. 3. Initially, an HTML trace file is opened (step 302) using typical file opening techniques known to those skilled in the art. Furthermore, the file opening step includes writing some initial HTML tag identifiers that, by standard (such as the HTML 4.01 recommendation, released by the world wide web consortium, W3C, on Dec. 24, 1999), identify a file as being an HTML file and establish such features for the file as a title. These tag identifiers include <html>, <head>, <title> and <body>. Once the HTML formatter 104 has received (step 304) trace point data from the data observer 102, the nature of the trace point data is determined in a multi-stage process.

If the trace point data is determined to be generated by a Data Point (step 306), a trace point index identifying the Data Point is written to the open HTML file (step 308) along with any data associated with the Data Point (step 310) in a color determined by the current value of the color count and with an indent determined by the current indent level. It is then determined whether any further trace point data is to be processed (step 312).

If the trace point data is determined to be generated by an Entry Point (step 314), the color count and indent level are increased (step 316). The identity of the function entered is then written to the HTML file (step 318), in a color determined by the current value of the color count and with an indent determined by the current indent level. It is then determined whether any further trace point data is to be processed (step 312).

To set the color of text in HTML, it is known to encapsulate the text of interest in "font" tag identifiers (a start tag and end tag). Additionally, indenting of text in HTML may be accomplished through encapsulating the text in "blockquote" tag identifiers. The following is an example of the identification of an Entry Point, where the color has been set and the text has been indented.

<blockquote type="cite">
<font color="navy">
Entered Function function_name
</font>
</blockquote>

If text encapsulated by a first set of "blockquote" tag identifiers and a second set of "blockquote" tag identifiers, the text will appear twice indented.

If the trace point data is determined to be generated by an Exit Point (step 320), the identity of the function exited is written to the HTML file (step 322), in a color determined by the current value of the color count and with an indent determined by the current indent level. Additionally, any data associated with the Exit Point (say a return value from the function exited) is written to the HTML file (step 324). The color count and indent level are decreased (step 326) and it is determined whether any further trace point data is to be processed (step 312).

If the trace point data is determined to be generated by an Error Point (step 328), a trace point index identifying the Error Point is written to the open HTML file (step 330), in a color determined by the current value of a color count and with an indent determined by the current indent level. Additionally, any data associated with the Error Point is written to the HTML file (step 332). It is then determined whether any further trace point data is to be processed (step 312).

When it is determined that no further trace point data is to be processed (step 312), the HTML file is closed (step 334). The closing of the HTML trace file is performed using typical file closing techniques known to those skilled in the art. Furthermore, the file closing step includes writing, before the file is closed, some final HTML tag identifiers that, by the above-noted standard, identify the end of an HTML file. These tag identifiers include </body> and </html>.

As will be appreciated by a person skilled in the art, there may be significantly more than four types of trace points that may be placed in the code, where a message generated by executing code reaching each such trace point requires a unique action by the HTML formatter 104. The above types (Data Point, Enter Point, Exit Point, Error Point) are presented merely as exemplary trace points.

While developing code using a software development tool capable of methods exemplary of the present invention, the insertion of trace points into code may be accomplished by including in the tool a set of macros. Calls to individual ones of this set of macros may be placed in code developed and executed within the software development tool so that trace point messages are generated during the execution of the code.

As discussed hereinbefore, one trace point of interest is an Entry Point. The developer, that is, the user of the software development tool, should be instructed to start off each function in the code under composition by using a TRACE_ENTRY macro. The TRACE_ENTRY macro preferably includes a parameter, TRACE_ENTRY(a), so that the message generated in response to the macro running includes the name of the function that was entered. The TRACE_ENTRY macro may also set up information that may be required by the other trace point macros. As such, it is preferred that the TRACE_ENTRY macro be called before any other trace point macro in the function.

As a complement to the TRACE_ENTRY macro there may be a set of TRACE_EXIT macros. The developer should be instructed to call one of this set of macros whenever a function is about to exit, especially in a function wherein the TRACE_ENTRY macro has been called. In general, it is good code development practice to only have one return point in each function, so each function will typically have only one TRACE_EXIT macro. Each of the TRACE_EXIT macros may make use of one or both of two defined parameters. One parameter (a) may be used to provide the name of the function and the other (b) may be used to provide a return code from the function. Under normal circumstances, only the return code is provided, i.e., TRACE_EXIT(b). However, if, for some reason, it is necessary to provide the name of the function, a first supplementary TRACE_EXIT macro may be provided with the following structure: TRACE_EXIT_EXT(a, b). Additionally, if the function of interest is known to return void, a second supplementary TRACE_EXIT macro may be provided with the following structure: TRACE_EXIT_VOID( ).

Macros to implement Data Points may be used to trace data within functions to assist diagnosis of unexpected situations. Parameters used in such a TRACE_DATA macro may include specific parameters to represent the name of the function (a), a trace point index (b), used to determine the point in the code where the trace point is located, a pointer to the data that is being logged (c), an indication of the size of the data at c (d) and the type of data (e). The type of the data may be indicated, for instance, as DATA_INT for an integral type of data, DATA_STR for a string type of data or DATA_NONE for data that is neither integral or string. A typical call of the TRACE_DATA macro may have the following structure: TRACE_DATA(b, c, d, e). The, largely unnecessary, option of providing the function name may be accomplished by calling a macro with the following structure: TRACE_DATA_EXT(a, b, c, d, e).

A TRACE_ERROR macro may be used in place of a TRACE_DATA macro in locations in the code that are only reached when an error condition occurs. The parameters and types are identical to the TRACE_DATA macros otherwise. Typically, a TRACE_ERROR macro to implement an Error Point will have the following structure: TRACE_ERROR(b, c, d, e). Just as in the case of the TRACE_DATA macro, a TRACE_ERROR macro may included that provides the function name and has the following structure: TRACE_ERROR_EXT(a, b, c, d, e).

Figure 4:
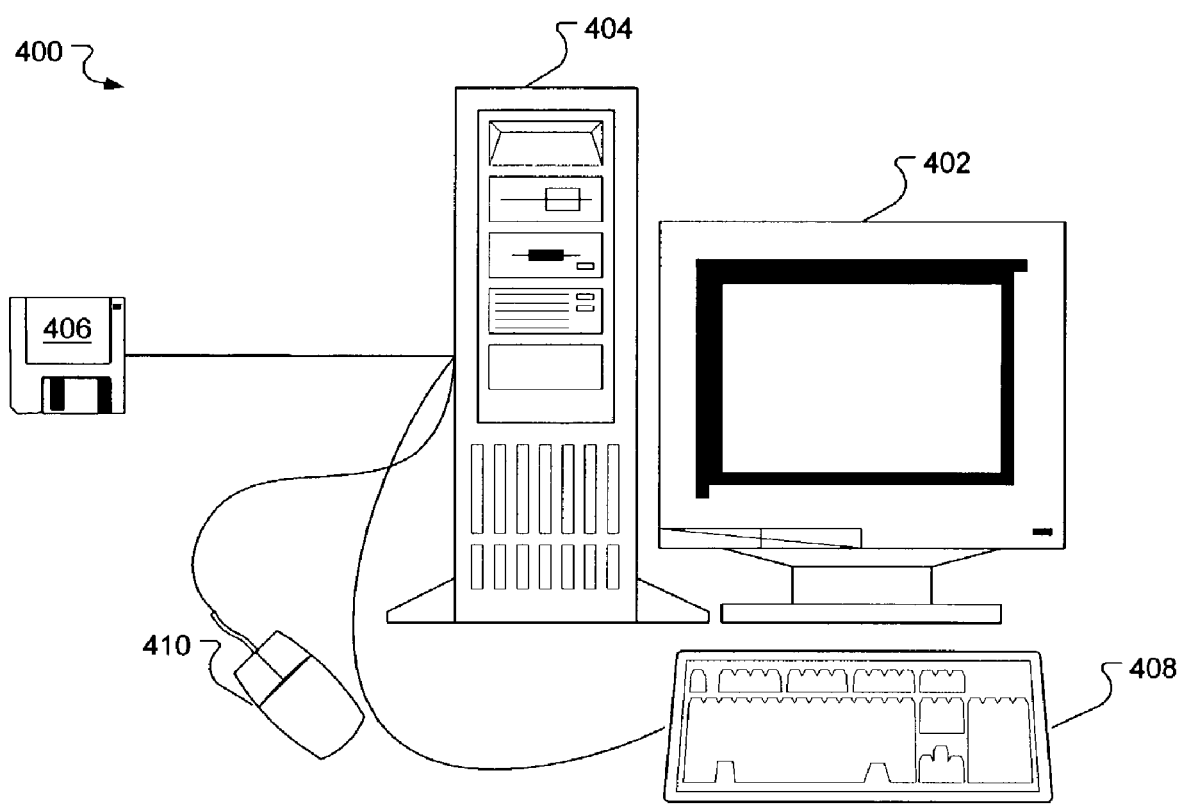
FIG. 4 illustrates a software development system.

A software development system 400, capable of producing program execution trace files, is illustrated in FIG. 4. The software development system 400 includes a display monitor 402 and a data processing unit 404. The data processing unit 404 may include hardware to network with other computers, long term and short term memory and a processor. As is typical, connected to the data processing unit 404 may be multiple input peripherals such as a keyboard 408 and a mouse 410. The software development system 400 may be loaded with a software development tool for executing methods exemplary of this invention from a software medium 406 which could be a disk, a tape, a chip or a random access memory containing a file downloaded from a remote source.

As will be apparent to a person skilled in the art, if the code being tested is appropriately formatted, the HTML trace file output could include hyperlinks to the code being tested. That is, a particular line of trace point data in the HTML trace file may be formatted as a hyperlink that points to the location in the code being tested that holds the trace point that led to the generation of the trace point data. The hyperlinks would allow service representatives, who have access to the source code but are not familiar with the code, to make sense of the trace very easily in debugging problems. The hyperlinks would also make the trace file easier to follow in relation to the source code and may significantly ease the diagnosis of problems.

Figure 5:
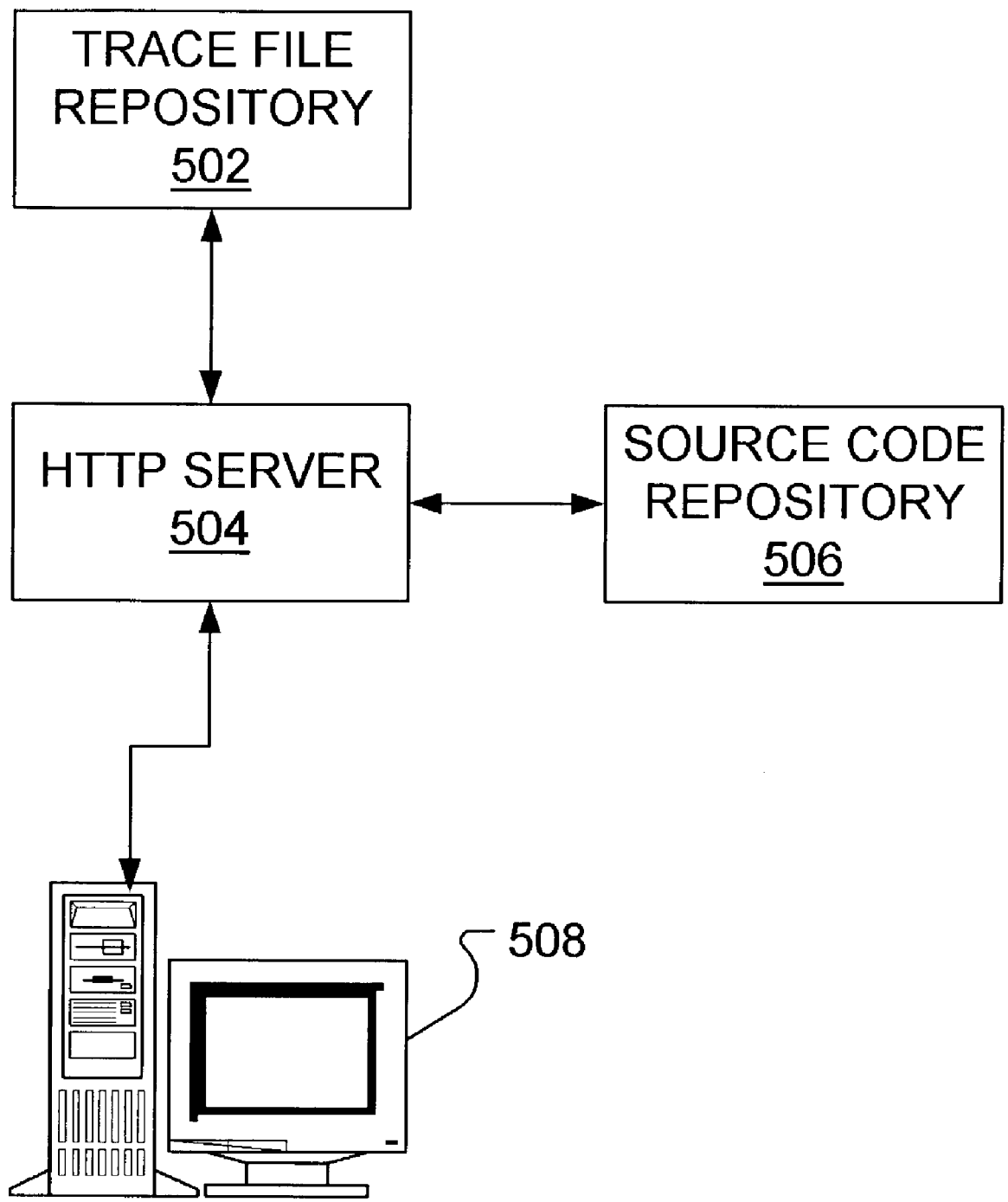
FIG. 5 schematically illustrates interaction between assorted network components.

To accommodate the addition of hyperlinks to the HTML trace file, there may be a requirement that both the HTML trace file and the source code being tested be available to be served by a web server. In FIG. 5, such a web (Hyper-Text Transfer Protocol, HTTP) server 504 is illustrated as maintaining a connection to a trace file repository 502 and a source code repository 506. A first HTTP request, over a connection with a web client 508, may arrive at the web server 504 requesting a trace file. The web server may then retrieve the requested trace file from the trace file repository 502 and respond, with the requested trace file, to the web client 508. A user of the web client 508 may select a hyperlink in the received trace file. Such a selection results in a second HTTP request being sent from the web client to the web server 504. To respond to the second HTTP request, the web server may first retrieve the requested source code from the source code repository 506. The source code may then be provided to the web client 508 by the web server 504 such that the trace point in the code that led to the generation of the trace point data in the trace file is centered on the view provided to the user of the web client 508.

Advantageously, aspects of the present invention overcome common problems with program execution trace files by writing trace point data using a markup language that provides for formatting and visual text attributes and merely requires a standard viewing tool, namely any web browser. As will be apparent to a person skilled in the art, the markup language used for writing the program execution trace files may be other than HTML, as long as the markup language is standardized and merely requires a standard viewing tool, as is the case with, for instance, the Extensible Markup Language (XML).

Other modifications will be apparent to those skilled in the art and, therefore, the invention is defined in the claims.

The embodiments of the invention in which an exclusive property or privilege is claimed are defined as follows:

1. A method of manipulating a program execution trace file located in a computer readable medium, said method performed by a data processing unit executing predetermined computer programmed instructions, comprising:
   receiving a trace point message;
   reading trace point data from said trace point message; and
   writing said trace point data to said program execution trace file on said computer readable medium, where said trace point data is formatted using a standard markup language that is the hyper-text mark-up language.
   wherein said trace point message is generated in response to an Exit Point placed in a given function, and said trace point data comprises an identity of said given function and further comprises a return value for said given function.

2. A method of manipulating a program execution trace file located in a computer readable medium, said method performed by a data processing unit executing predetermined computer programmed instructions, comprising the steps of:
   receiving a trace point message;
   writing trace point data to said program execution trace file on said computer readable medium, where said trace point data is formatted using a standard markup language that is the hyper-text mark up language, and said writing step comprises encapsulating said trace point data within tag identifiers that indicate a color corresponding to a color count value, said writing step further comprising reducing said value of said color count.

3. A method of manipulating a program execution trace file located in a computer readable medium, said method performed by a data processing unit executing predetermined computer programmed instructions, comprising the steps of:
   receiving a trace point message;
   reading trace point data from said trace point message; and
   writing said trace point data to said program execution trace file in said computer readable medium, where said trace point data is formatted using a standard markup language that is the hyper-text markup language, and said writing step comprises encapsulating said trace point data within tag identifiers that indicate a color corresponding to a color count value, wherein said color count repeats after a preset maximum value.

4. A method of manipulating a program execution trace file located in a computer readable medium, said method performed by a data processing unit executing predetermined computer programmed instructions, comprising the steps of:
   receiving a trace point message;
   reading trace point data from said trace point message; and
   writing said trace point data to said program execution trace file in said computer readable medium, where said trace point data is formatted using a standard markup language, and said writing step comprises encapsulating said trace point data within tag identifiers that indicate a color corresponding to a color count value that repeats after a preset maximum value.

5. A method of manipulating a program execution trace file located in a computer readable medium, said method performed by a data processing unit executing predetermined computer programmed instructions, comprising:
   receiving a trace point message;
   reading trace point data from said trace point message; and
   writing said trace point data to said program execution trace file on said computer readable medium, where said trace point data is formatted using a standard markup language,
   wherein said writing said trace point data to said program execution trace file comprises encapsulating said trace point data within tag identifiers,
   said tag identifiers indicate a visual attribute to associate with said trace point data,
   said visual attribute is a color corresponding to a value of a color count,
   said trace point message is generated in response to an Exit Point placed in a given function and said trace point data comprises an identity of said given function, and said trace point data further comprises a return value for said given function.

6. A method of manipulating a program execution trace file located in a computer readable medium, said method performed by a data processing unit executing predetermined computer programmed instructions, comprising:

receiving a trace point message;

reading trace point data from said trace point message; and writing said trace point data to said program execution trace file on said computer readable medium, where said trace point data is formatted using a standard markup language, wherein said trace point message is generated in response to an Exit Point placed in a given function, and said trace point data comprises an identity of said given function and further comprises a return value for said given function.

7. A method of manipulating a program execution trace file located in a computer readable medium, said method performed by a data processing unit executing predetermined computer programmed instructions, comprising the steps of:

receiving a trace point message;

reading trace point data from said trace point message; and writing said trace point data to said program execution trace file on said computer readable medium, where said trace point data is formatted using a standard markup language, and said writing step comprises encapsulating said trace point data within tag identifiers that indicate a color corresponding to a color count value, said writing step further comprising reducing said value of said color count.

* * * * *